US005617833A

United States Patent [19]

Tomisawa et al.

[11] Patent Number: 5,617,833

[45] Date of Patent: Apr. 8, 1997

[54] APPARATUS AND METHOD FOR DIAGNOSING EXHAUST RECIRCULATION SYSTEM IN INTERNAL COMBUSTION ENGINE

[75] Inventors: Naoki Tomisawa, Takasaki; Kenichi Machida, Isesaki, both of Japan

[73] Assignee: Unisia Jecs Corporation, Atsugi, Japan

[21] Appl. No.: 577,461

[22] Filed: Dec. 21, 1995

[30] Foreign Application Priority Data

Dec. 22, 1994 [JP] Japan .................................... 6-320516

[51] Int. Cl.[6] .......................... F02M 25/07; G01M 15/00

[52] U.S. Cl. .......................................... 123/571; 73/117.3

[58] Field of Search .................................... 123/568, 569, 123/571, 425, 435; 73/117.3

[56] References Cited

U.S. PATENT DOCUMENTS

| | | | |
|---|---|---|---|
| 4,314,534 | 2/1982 | Nakajima et al. | 123/571 |
| 4,524,628 | 6/1985 | Knudtson et al. | 73/863.43 |
| 4,531,499 | 7/1985 | Eckert et al. | 123/571 |
| 4,622,939 | 11/1986 | Matekunas | 123/435 |
| 4,624,229 | 11/1986 | Matekunas | 123/435 |
| 4,721,089 | 1/1988 | Currie et al. | 123/571 |
| 4,966,117 | 10/1990 | Kawamura | 123/425 |
| 5,205,260 | 4/1993 | Takahashi et al. | 123/571 |
| 5,245,969 | 9/1993 | Nishiyama et al. | 123/435 |
| 5,359,975 | 11/1994 | Katashiba et al. | 123/571 |

FOREIGN PATENT DOCUMENTS

| | | |
|---|---|---|
| 4-081557 | 3/1992 | Japan . |
| 7-286561 | 10/1995 | Japan . |

*Primary Examiner*—Willis R. Wolfe
*Attorney, Agent, or Firm*—Foley & Lardner

[57] ABSTRACT

In apparatus and method for diagnosing an EGR (Exhaust Gas Recirculation) system in an internal combustion engine, a combustion time duration (MT) in one combustion stroke is measured, the combustion time duration including at least an approximately combustion end period, a predictive (reference) combustion time duration (MTA) in one combustion stroke is derived on the basis of engine driving condition and a target EGR rate to be carried out by the EGR system, and the measured combustion time duration (MT) is compared with the predictive (reference) combustion time duration (MTA). Depending on a result of the comparison, the diagnosing apparatus and method determine whether a failure in the EGR system occurs.

11 Claims, 7 Drawing Sheets

APPARATUS AND METHOD FOR DIAGNOSING EXHAUST RECIRCULATION SYSTEM IN INTERNAL COMBUSTION ENGINE

BACKGROUND OF THE INVENTION

1. Field of the Invention

The present invention relates to apparatus and method for diagnosing an exhaust gas recirculation system for an internal combustion engine, the exhaust gas recirculation system being disposed in the engine so as to recirculate part of exhaust gas to a suction system of the engine.

2. Description of the Background Art

An exhaust gas recirculation system which recirculates part of engine exhaust gas into an intake manifold so as to reduce a maximum combustion temperature in each combustion chamber of engine cylinders in order to reduce a harmful component of NOx (Nitrogen compound, x is for example 1, ½, ⅔ or so forth) in the exhaust gas is exemplified by a Japanese Patent Application First Publication No. Heisei 4-81557 (published on Mar. 16, 1992).

Due to a failure in the exhaust gas recirculation system, the exhaust gas recirculation is not carried out under an engine driving condition such that the exhaust gas recirculation (hereinafter, referred often to as EGR) should be carried out. On the contrary, due to the failure in the system, the exhaust gas recirculation is carried out under the engine driving condition such that the exhaust gas recirculation should not be carried out. Consequently, a sufficient reduction in an NOx exhaust gas quantity cannot be achieved and an engine driveability becomes worsened.

It is, therefore, desired that apparatus and method for diagnosing, with a high diagnosis accuracy, whether the exhaust gas recirculation system operates normally or malfunctions (operates abnormally) are developed.

SUMMARY OF THE INVENTION

It is therefore a principal object of the present invention to provide the apparatus and method for diagnosing whether a failure in an exhaust gas recirculation system disposed in an internal combustion engine occurs with a high diagnosis accuracy.

The above-described object can be achieved by providing an apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, comprising: a) detecting means for detecting an engine driving condition; b) combustion state related parameter measuring means for measuring a combustion state related parameter of at least one combustion chamber of engine cylinders; c) combustion time duration measuring means for measuring a length of a combustion time duration in one combustion stroke within the combustion chamber including at least an approximately end period of the one combustion stroke on the basis of the measured combustion state related parameter; d) predictive combustion time duration determining means for determining a target recirculation rate to be normally achieved by controlling an opening angle of the exhaust gas recirculation control valve means via the EGR control signal on the basis of the detected engine driving condition and for determining a length of a predictive combustion time duration on the basis of the determined target exhaust gas recirculation rate; and e) failure diagnosing means for comparing the length of the measured combustion time duration with that of the predictive combustion time duration so as to diagnose whether a failure occurs in the exhaust gas recirculation system according to a result of the comparison.

The above-described object can be achieved by providing an apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, said apparatus comprising: a) first measuring means for measuring an engine driving condition; b) first detecting means for detecting an ignition timing of a corresponding one of combustion chambers in engine cylinders; b) second measuring means for measuring a magnitude of the inner cylinder pressure (Pi) in the corresponding one of the engine combustion chambers from a time when the first detecting means detects the ignition timing; c) time duration measuring means for measuring a predetermined time duration from a start time at which the inner cylinder pressure indicates a first predetermined value (MPi) when the ignition timing is detected to an end time at which the inner combustion chamber pressure again indicates the first predetermined value (MPi); d) reference time duration calculating means for driving a target exhaust gas recirculation rate on the basis of the detected engine driving condition and for calculating a reference time duration ($MT_1$, $MT_2$) on the basis of the calculated target gas recirculation rate; e) comparing means for comparing the predetermined time duration (MT) and the reference time duration (MTA) and for diagnosing whether a failure occurs in the exhaust gas recirculation system according to a result of the comparison; and f) outputting means for outputting a warning signal when said comparing means diagnoses that the failure occurs in the exhaust gas recirculation system.

The above-described object can also be achieved by providing a method for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, comprising the steps of: a) detecting an engine driving condition; b) measuring a combustion state related parameter of at least one combustion chamber of engine cylinders; c) measuring a length of a combustion time duration in one combustion stroke within the combustion chamber including at least an approximately end period of the one combustion stroke on the basis of the measured combustion state related parameter; d) determining a target recirculation rate to be normally achieved by controlling an opening angle of the exhaust gas recirculation control valve means via the EGR control signal on the basis of the detected engine driving condition and determining a length of a predictive combustion time duration on the basis of the determined target exhaust gas recirculation rate; e) comparing the length of the measured combustion time duration with that of the predictive combustion time duration so as to diagnose whether a failure occurs in the exhaust gas recirculation system according to a result of the comparison; and f) outputting a warning signal if diagnosing that the failure occurs in the exhaust gas recirculation system at the step e).

BEST MODE FOR CARRYING OUT THE INVENTION

Reference will hereinafter be made to the drawings in order to facilitate a better understanding of the present invention.

(First Embodiment)

Figure 1:
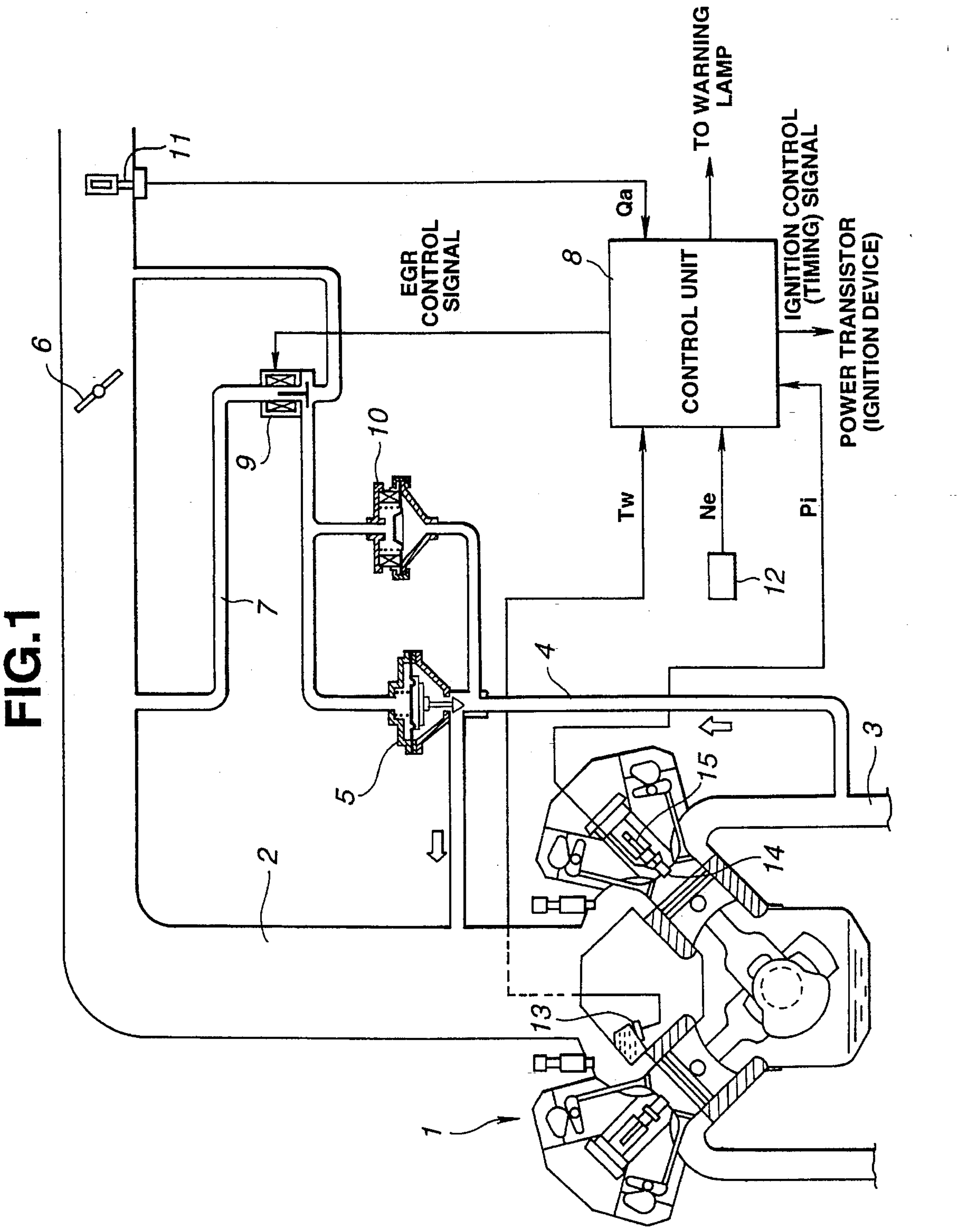
FIG. 1 is a system configuration of a first preferred embodiment of an apparatus for diagnosing an exhaust gas recirculation (EGR) system in an internal combustion engine according to the present invention.

FIG. 1 shows a system configuration of a diagnosing apparatus for diagnosing whether a failure in an exhaust gas recirculation (EGR) system occurs in a first preferred embodiment according to the present invention.

An exhaust gas recirculation (EGR) passage 4 is disposed in an internal combustion engine 1 so as to communicate an exhaust manifold 2 of the engine 1 with an intake manifold 3 (suction system). An EGR (Exhaust Gas Recirculation) control valve (exhaust gas recirculation control valve) 5 is interposed in the exhaust gas recirculation (EGR) passage 4.

The EGR control valve 5 is a diaphragm type valve in which a valve is open by acting an intake air negative pressure of the engine 1 upon its diaphragm portion via an EGR control solenoid valve 9 (as will be described later) against a biasing force in a closure direction of a valve body thereof by means of a coil spring installed with the diaphragm portion.

A negative (vacuum) pressure introduction passage 7 is disposed in the engine 1 so that a pressure chamber of the EGR control valve 5 is communicated with the intake manifold 3 located at a downstream of a throttle valve 6. The EGR control valve 5 is, thus, open when the intake negative pressure of the engine 1 is introduced into its pressure chamber via the negative pressure introduction passage 7.

The EGR control solenoid 9 is interposed in the negative pressure introduction passage 7 which is in an on or off state according to a content of an EGR control signal derived from a control unit 8. When the EGR control solenoid 9 is open or closed (on or off control) according to the EGR control signal derived from the control unit 8, the open or closure of the EGR control valve 5, namely, on (execution) or off (non-execution) of the exhaust gas recirculation (EGR) can be carried out.

It is noted that, in FIG. 1, reference numeral 10 denotes a diapihragm type BPT (Back Pressure Transducer) valve whose diaphragm is operated according to the exhaust gas pressure and intake manifold negative pressure so as to determine the magnitude of the negative pressure controlling the EGR control valve 5.

Figure 2:
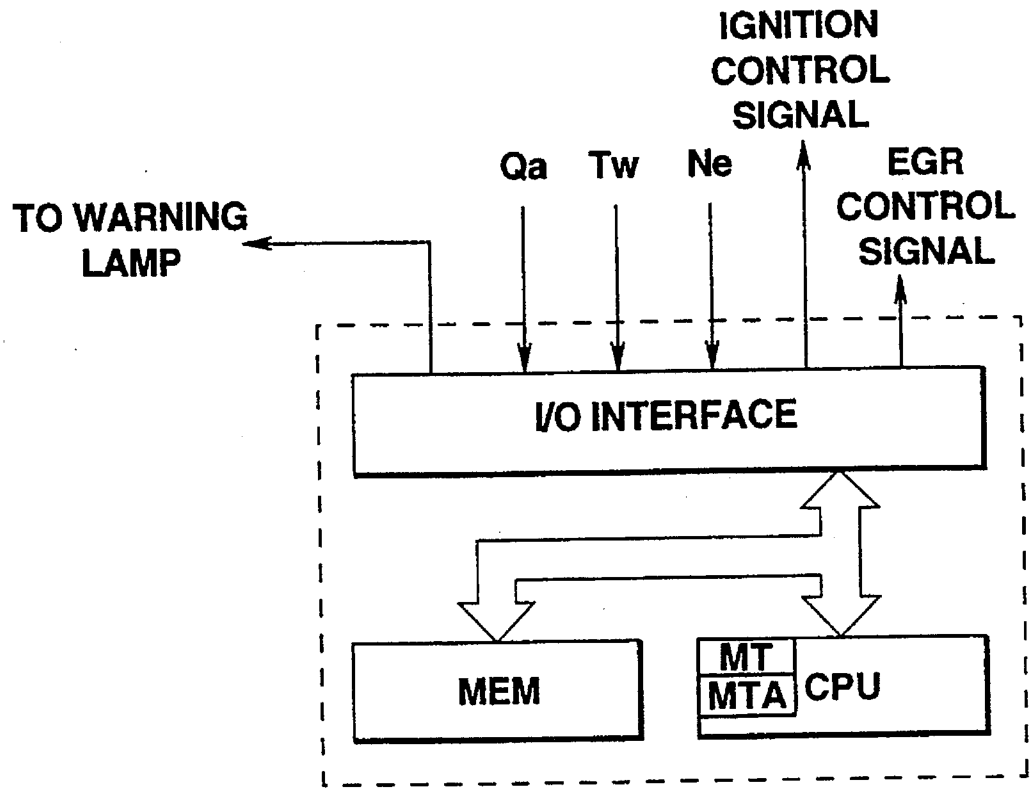
FIG. 2 is a circuit block diagram of a control unit having a microcomputer shown in FIG. 1.

The control unit 8, as shown in FIG. 2, includes a microcomputer having a CPU (Central Processing Unit); a memory (MEM) (generally includes a ROM (Read Only Memory) and RAM (Random Access Memory); an I/O interface; and a common bus.

The control unit 8 receives an intake air flow quantity signal Qa from an airflow meter 11, an engine revolution speed signal Ne from a crank angle sensor 12, and an engine coolant temperature signal Tw from an engine coolant temperature sensor 13 and outputs the on-or-off control signal (EGR control signal) to the EGR control solenoid 9 on the basis of an engine driving condition determined from the above-described received signals (Qa, Ne, and TW).

It is noted, that operating variables of the respective diaphragms of the EGR related valves (5, 9, and 10 are previously set so as to derive a target EGR rate previously set according to an engine load (for example, engine intake air quantity Qa) and engine revolution speed (Ne) and according to the on state of the EGR control signals.

Referring to FIG. 1, the control unit 8 receives an inner cylinder pressure detection signal Pi from an inner cylinder pressure (responsive) sensor 14. The inner cylinder pressure responsive sensor 14 is a washer type piezoelectric element which is inserted between an attaching seat surface of an ignition plug 15 and a bolt of the ignition plug 15 so as to monitor a movement of the ignition plug 15 displacing upon receipt of the inner cylinder pressure of any one of the engine cylinders. The inner cylinder pressure (responsive) sensor 14 is exemplified by U.S. Pat. No. 4,524,628 issued on Jun. 25, 1985 and U.S. Pat. No. 4,966,117 issued on Oct. 30, 1990 (the disclosures of which are herein incorporated by reference). Alternatively, the inner cylinder pressure responsive sensor of a type in which the inner cylinder pressure is detected as an absolute pressure with a sensing part of the inner cylinder pressure (responsive) sensor exposed directly into a combustion chamber of the corresponding one of the engine cylinders may be used.

In addition, the control unit 8 sets an ignition timing (ignition timing advance angle value) according to the engine driving condition and outputs an ignition timing signal to an ignition device (ignition circuit) (power transistor) at the set ignition timing. For the output of the ignition timing, the U.S. Pat. No. 4,966,117 (issued on Oct. 30, 1990) is exemplified, the disclosure of which being herein incorporated by reference.

Figure 3:
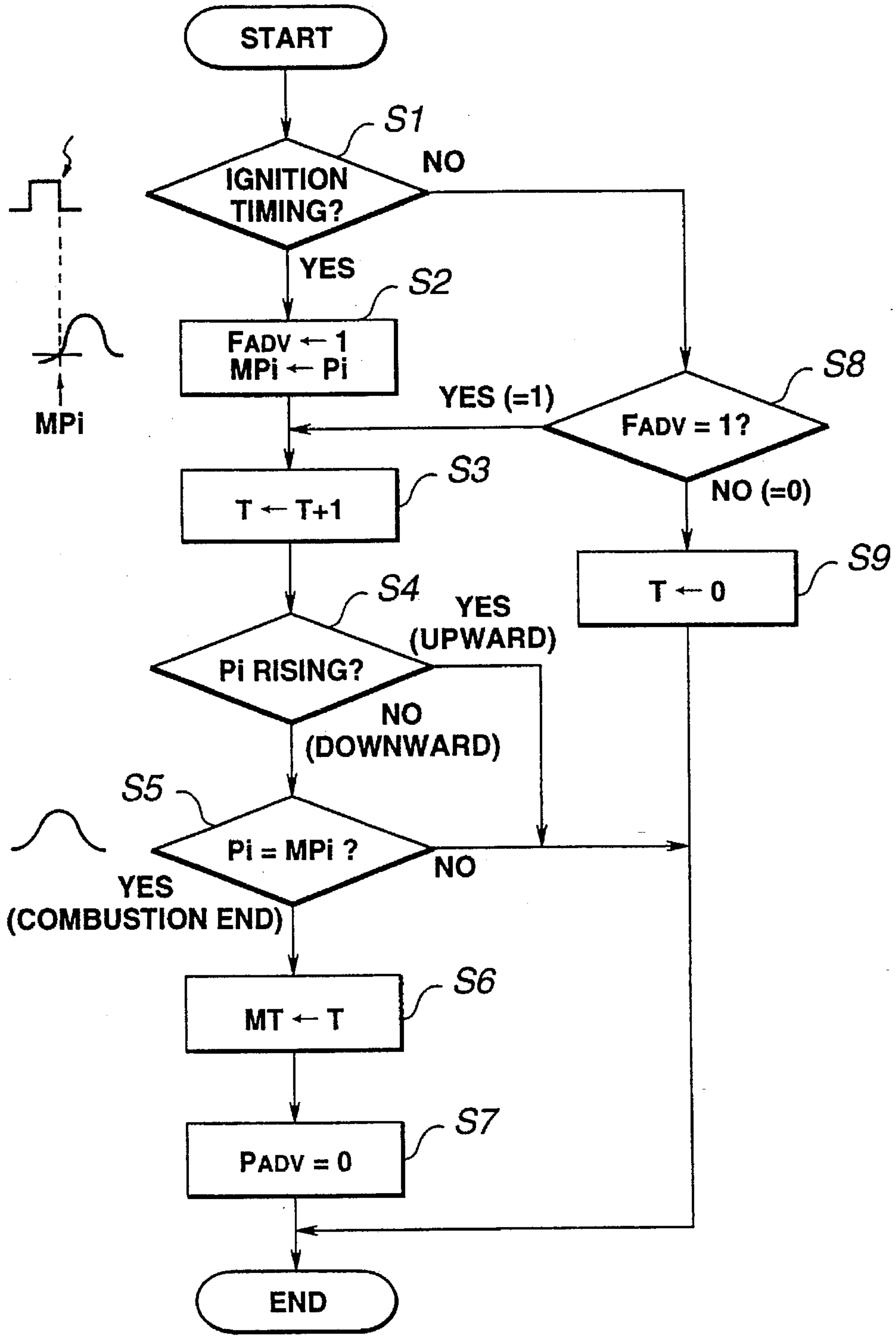
FIG. 3 is an operational flowchart indicating a combustion time duration monitoring routine executed by the control unit in the first embodiment shown in FIGS. 1 and 2.

FIG. 3 shows an operational flowchart executed by the control unit 8 to measure a (predetermined) combustion time duration for the corresponding one of combustion chambers to which the ignition plug 15 is exposed. Although the ignition plug 15 shown in FIG. 1 is exposed to the corresponding one of the combustion chambers of the engine cylinders, a plurality of ignition plugs are exposed to the combustion chambers of the engine cylinders.

The operational flowchart shown in FIG. 3 is executed for each predetermined period of time.

At a step S1, the CPU of the control unit 8 determines whether it is now the ignition timing for the corresponding one of the engine cylinders according to an output signal level of the ignition timing signal.

If it is now the ignition timing (YES) at the step S1, the routine goes to a step S2 in which a failure diagnosis flag $F_{ADV}$ is set to 1 indicating that the EGR system shown in FIG. 1 is under the failure diagnosis and the combustion chamber inner pressure Pi detected by the inner cylinder pressure sensor 14 at the ignition timing signal output to the ignition circuit is stored in the MEM, i.e., RAM as MPi ($F_{ADV}$←1 and MPi←Pi). Thereafter, the routine goes to a step S3.

On the other hand, if it is not the ignition timing (NO) at the step S1, the routine goes to a step S8 to determine whether it is now under the failure diagnosis, i.e., to determine whether the failure diagnosis flag $F_{ADV}$ indicates 1. In a case where the failure diagnosis flag $F_{ADV}$ indicates 1 (YES) at the step S8, the routine goes to a step S3. If the failure diagnosis flag $F_{ADV}$ indicates 0 (NO) at the step S8, the routine goes to a step S9 in, which a timer counting value T is reset to 0 and the present routine is ended.

At the step S3, the timer counts up (T=T+1).

At the next Step S4, the CPU determines whether the inner cylinder pressure within the combustion chamber Pi is in a midway through a rising on the basis of the measured magnitude of the inner cylinder pressure Pi. If the inner cylinder pressure within the combustion chamber Pi is in the midway through the rising (YES) at the step S4, the above-described flow is repeated from the step S1 through the step S3 until the combustion chamber inner pressure Pi starts its fall (goes downward), namely, until the step S4 indicates NO.

In the case of NO at the step S4, the routine goes to a step S5 since the fall in the inner cylinder pressure Pi is started.

At the step S5, the CPU determines whether the detected inner cylinder pressure Pi indicates the same value as the stored MPi at the step S2. If YES at the step S5 (Pi=MPi), the CPU determines that one combustion stroke in the corresponding chamber is ended and the routine goes to a step S6. If NO at the step S5, the CPU determines that the one combustion stroke is not yet ended and the routine is ended. Then, the above-described flow (steps S1 through S4) is repeated until the step S5 indicates YES (namely, until Pi=MPi).

At a step S6, the present count value T of the timer is stored into the RAM as MT.

At a step S7, the failure diagnosis flag $F_{ADV}$ is reset to 0 and the present flow is ended.

Consequently, the (predetermined) combustion time duration MT is measured.

Figure 4:
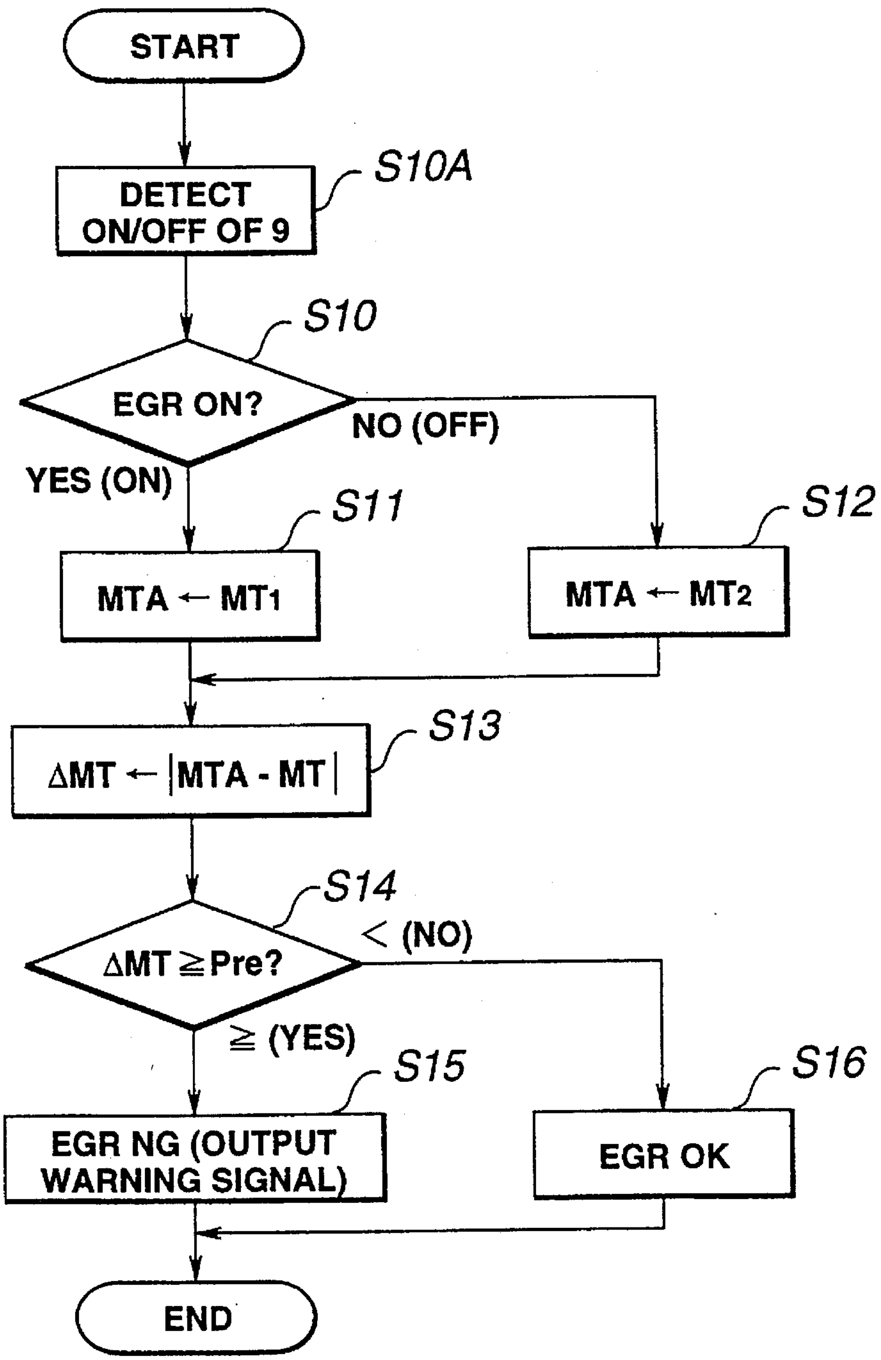
FIG. 4 is another operational flowchart indicating a failure diagnosing routine executed by the to control unit shown in FIGS. 1 and 2.

FIG. 4 shows another operational flowchart executed by the control unit 8 on the basis of the result of the execution of the (predetermined) combustion time duration shown in FIG. 3.

At a step S10A, the CPU monitors the content of the EGR control signal output to the EGR control solenoid 9. At a step S10, the CPU determines whether an on control signal is being output to the EGR control solenoid 9 (open control signal EGR-ON signal) or an off control signal (closure control signal EGR-OFF signal) is being output to the EGR control solenoid 9.

If the content of the EGR control signal indicates the EGR-ON signal (the open signal) at the step S10, the routine goes to a step S11.

If the content of the EGR control signal indicates the EGR-OFF signal (the closure signal) at the step S10, the routine goes to a step S12.

Figure 6A:
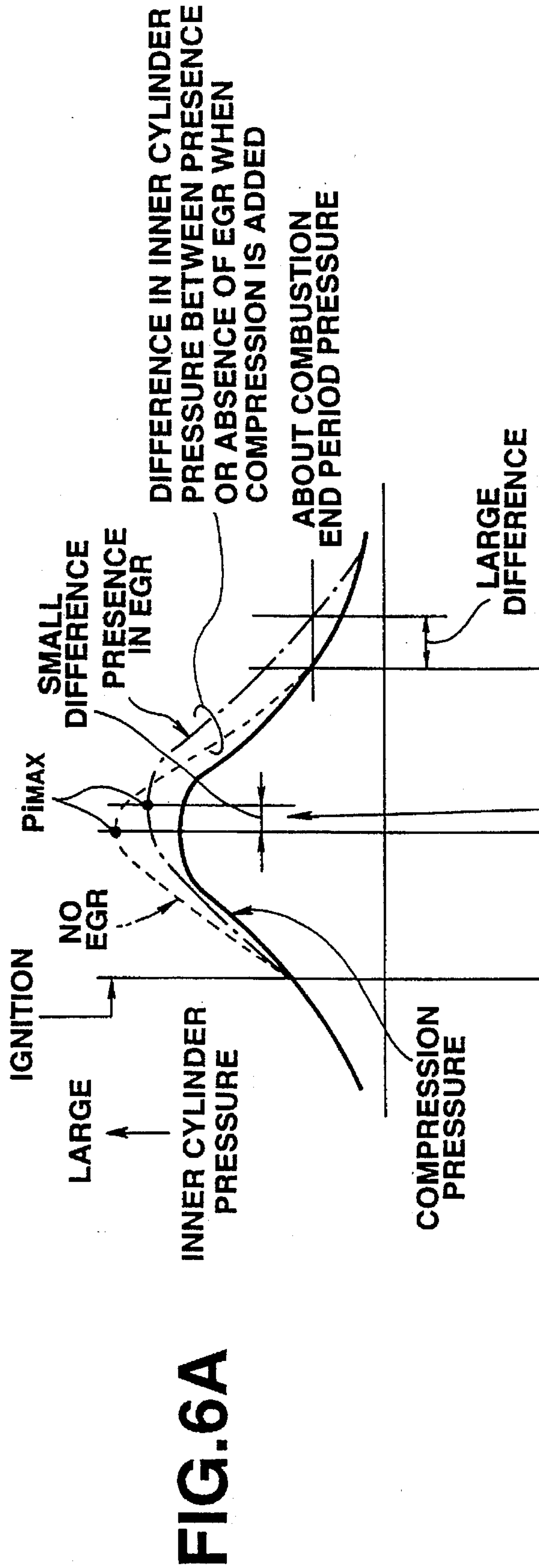
FIGS. 6A and 6B are characteristic graphs of combustion chamber inner (cylinder) pressures Pi when a compression pressure exerted by a piston is added and not added for explaining a combustion time duration in one combustion stroke in the case of the first embodiment.
Figure 6B:
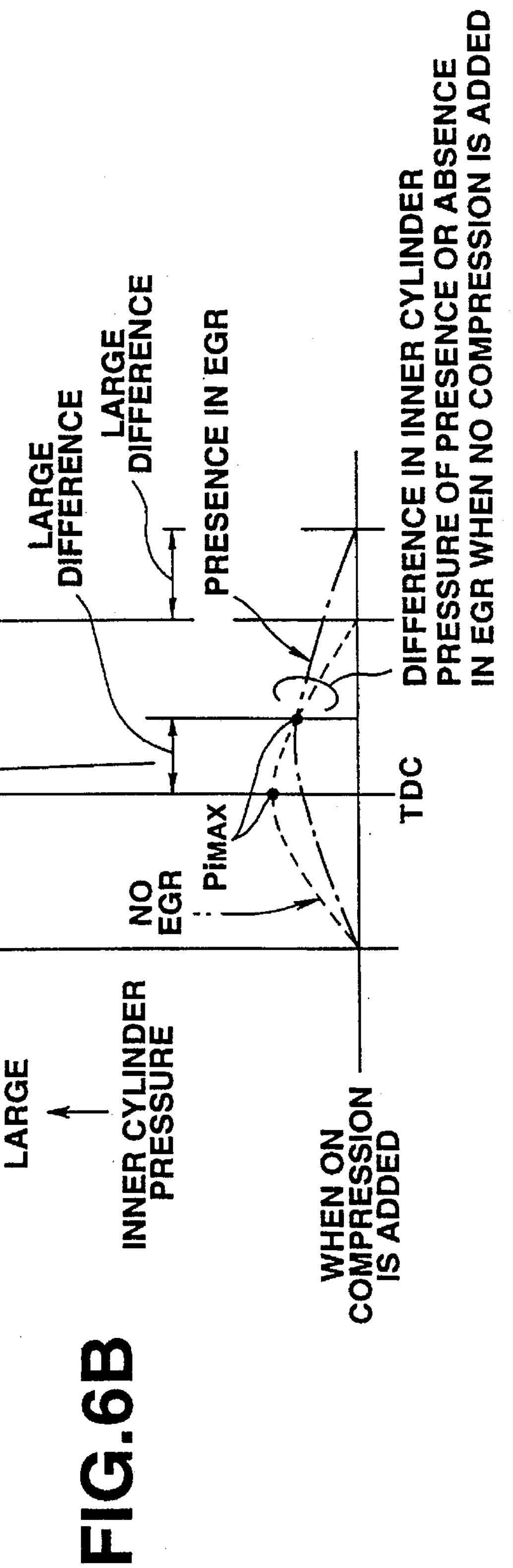
Figure 6C:
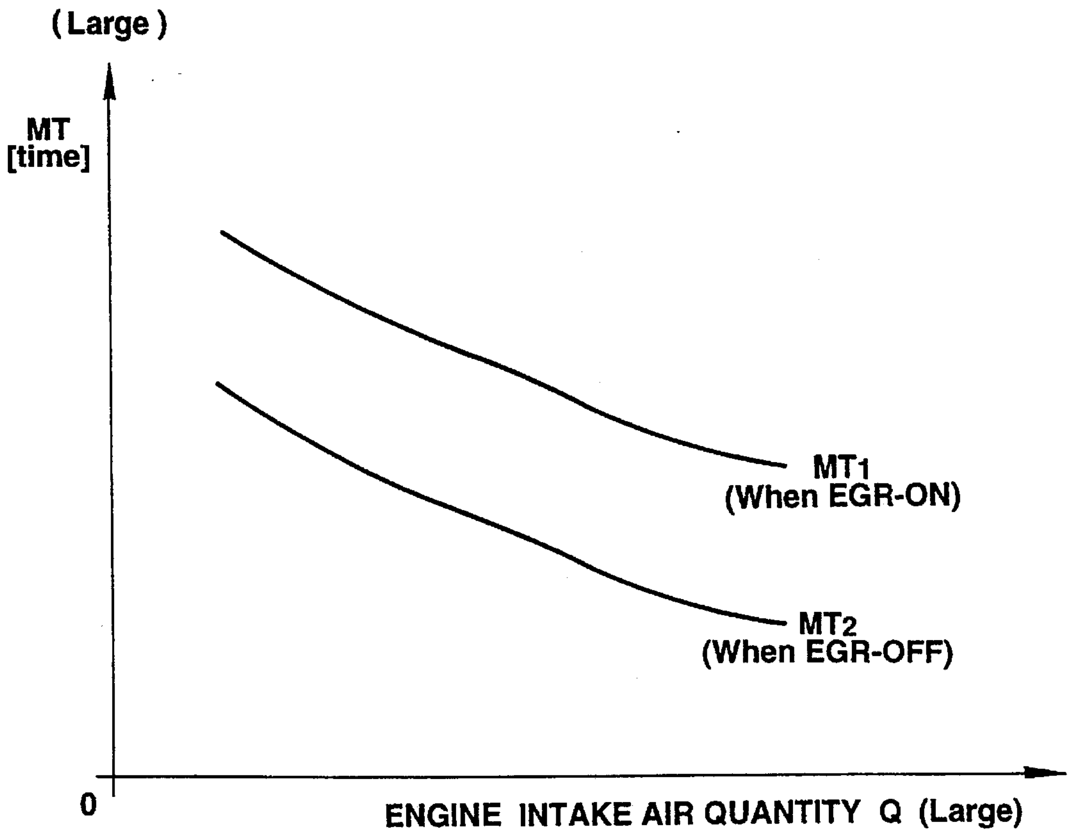
FIG. 6C is a map indicating two predictive time durations $MT_1$ (when an EGR is ON (carried out)(EGR-ON)) and $MT_2$ (when the EGR is OFF (not carried out) (EGR-OFF)).

At the step S11, the CPU looks up (refers to) a map indicating the predictive (reference) time duration ($MT_1$) shown in FIG. 6C with read parameters of a present engine intake air quantity Q (or alternatively engine load and engine revolution speed) derived on the basis of the intake air quantity qa detected by the airflow meter 11 and the engine revolution speed Ne and of the on control signal output to the EGR control solenoid 9 (which corresponds to the target EGR rate under the present driving condition) and sets the read predictive (reference) time duration $MT_1$ into a register MTA (MTA←$MT_1$). The predictive time duration $MT_1$ (which corresponds to the combustion time, duration in a case when the target EGR rate is obtained) is a time duration from a time at which the ignition is started to a time at which the inner cylinder pressure Pi is returned to the predetermined inner cylinder pressure (which corresponds to MPi stored in the RAM at the step S2) which would be derived under the present combustion state (the combustion state determined from the engine load, engine revolution speed, the target EGR rate, the engine coolant temperature, and so forth in the case where the EGR is carried out).

On the other hand, at the step S12, the CPU looks up (refers to) the map indicating the other predictive (reference) time duration $MT_2$ shown in FIG. 6C with read parameters of the present intake air quantity Q (or alternatively the engine load and engine revolution speed Ne) and of the off control signal (which corresponds to zeroed EGR rate) to the EGR control solenoid 9, reads the predictive reference time duration $MT_2$ from the map, and sets the read predictive (reference) time duration $MT_2$ into the register MTA.

The other predictive time duration is the time duration (which corresponds to the combustion time duration in a case when the target EGR rate is zeroed) from the time at which the ignition is started to the time at which the inner cylinder pressure Pi is returned to the predetermined inner cylinder pressure (which corresponds to MPi stored in the RAM at the step S2) which would be derived under the present combustion state (the combustion state determined from the engine load, engine revolution speed, the target EGR rate, the engine coolant temperature, and so forth in the case where the EGR is not carried out).

At the next step S13, the CPU derives an absolute difference ΔMT between the value of MTA set during the execution of either the step S11 or the step S12 and the value of MT derived at the step S6 (ΔMT=|MTA−MT|).

At the next step S14, the CPU compares the value of ΔMT with a predetermined value (Pre), i.e., determines whether the value of ΔMT is equal to or greater than the predetermined value (Pre). The predetermined value (Pre) (allowance limit value) may be varied according to the present driving condition, EGR-ON time, and/or EGR-OFF time (i.e., target EGR rate). The reason that the predetermined value (Pre) may be varied will be described below.

That is to say, if the target EGR rate is large, a slight difference in the EGR rate exerts a large difference on the engine driveability. If the target EGR rate is zeroed, the slight difference in the EGR rate exerts little influence on the engine driveability. Therefore, it is preferable to set an optimum predetermined value according to the engine driving condition and the target EGR rate.

Referring to the step S14, if the CPU determines that ΔMT is equal to or above the predetermined value (Pre) (YES), the routine goes to a step S15. At the step S15, the CPU determines that some abnormality occurs in the EGR system (failure occurs in the EGR system). If ΔMT<predetermined value (Pre) (NO) at the step S14, the routine goes to a step S16 in which the CPU determines that the EGR system operates normally.

That is to say, in the case of the EGR-ON mode (using $MT_1$ as MTA), the CPU can determine that the present EGR rate differs from the target EGR rate by a predetermined magnitude so that the combustion time duration is changed. On the other hand, in the case of the EGR-OFF mode (using $MT_2$ as MTA), the CPU can determine that the EGR system carries out the EGR by the predetermined magnitude even if the present time falls in a region in which the EGR is not carried out due to some abnormality occurring in the EGR system so that the combustion time duration is changed.

In more details, if the exhaust gas recirculates from the exhaust manifold 3 via the EGR system is mixed into an air-fuel mixture, an intermolecular density of gas in each combustion chamber becomes small so that a flame propagation becomes late and a combustion speed becomes slow, thus the combustion being inactivated and the combustion time duration (interval) being elongated.

In the first embodiment, with this characteristic of the combustion time duration in mind, the failure in the EGR system is diagnosed with high accuracy by monitoring the time duration from a time at which the ignition is started, the inner cylinder pressure (combustion pressure), thereafter, once rises to a time at which the inner cylinder pressure falls into the same predetermined pressure as that at the initial stage of combustion (namely, one combustion stroke is approximately ended).

That is to say, at a combustion late period of the combustion time duration at which an influence of a compression pressure exerted by a piston of each corresponding one of the engine cylinders is less, a difference in the combustion chamber inner pressure due to an execution (presence) of the EGR or non-execution (absence) of the EGR (as appreciated from FIG. 6A or 6B) or due to a deviation between the target EGR rate and actual EGR rate becomes remarkable. Hence, the execution or non-execution of the EGR in the EGR system or the deviation between the target EGR rate and actual EGR rate is reflected on the monitoring result of the combustion time duration on the basis of combustion chamber inner pressure results at the approximately combustion late (end) period of the combustion time duration. Thus, the monitoring (detecting) of the combustion time duration permits the accurate diagnosis of the failure in the EGR system.

FIGS. 6A and 6B show the combustion chamber inner (cylinder) pressure variations in cases when a compression pressure Pi exerted by a piston of the corresponding cylinder is considered and not considered, respectively.

As denoted by a dotted line and a dotted-and-dash line of FIG. 6A, a difference between the combustion chamber inner pressure (inner cylinder pressure) variations when the EGR rate control is carried out and when the EGR rate control is carried out becomes large at the approximately end period of the combustion. This difference becomes large in the same way as in the case where the compression pressure is not considered as shown in FIG. 6B. Hence, the difference in the combustion time durations including the approximately end period of the combustion stroke when the EGR system operates normally and when the EGR system fails even if the EGR control solenoid 9 to execute the EGR rate control (EGR-ON) or to the EGR control solenoid 9 not to execute the EGR rate control (EGR-OFF) becomes remarkable.

It is noted that if the failure in the EGR system is diagnosed by measuring a time duration from the time at which the ignition is started up to a time at which the inner cylinder pressure indicates a maximum (Pimax), the monitored value of the combustion chamber inner (cylinder) pressure includes a variation in the combustion chamber inner (cylinder) pressure along with upward and downward movements of its piston to and from a UTDC (Upper Top Dead Center) from and to a BTDC (Bottom Top Dead Center) at a large rate. Thus, in this case, a crank angular position difference of the maximum combustion pressure (Pimax) due to the deviation between the target EGR rate and the actual EGR rate cannot accurately be measured and the high diagnosis accuracy of the EGR system cannot be assured since influences of a variation in performance of the inner cylinder pressure (responsive) sensor being used and conditions (temperature and density) of engine intake air are received.

As an alternative of the first embodiment, with the combustion chamber inner (cylinder) pressure at the time of the approximately end period of the combustion time duration previously stored in the RAM so as to correspond to the combustion state, the stored combustion inner (cylinder) pressure at the approximately end period may be compared with the actually measured combustion camber inner (cylinder) pressure at the approximately end period so as to diagnose whether the failure in the EGR system occurs.

In addition, although, in the first embodiment, the detection of the combustion start is the detection of the ignition timing signal, the detection of the combustion start may be a time at which a rise rate of the combustion chamber inner (cylinder) pressure becomes large by a predetermined rate, the time being a start time of the timer counting (therefore, the diagnosing apparatus and method according to the present invention is applicable to a Diesel engine having no ignition plug and ignition circuits(device)).

Furthermore, although, in the first embodiment, the detection of the approximately late period of the combustion time duration being the time at which the combustion chamber inner (cylinder) pressure indicates that at the time of the ignition start, the detection of the approximately late period of the combustion time duration may be a time at which the combustion chamber inner (cylinder) pressure indicates a predetermined combustion chamber inner (cylinder) pressure previously set according to the combustion state.

(Second Embodiment)

A second preferred embodiment of the diagnosing apparatus for the EGR system will be described below.

Figure 5:
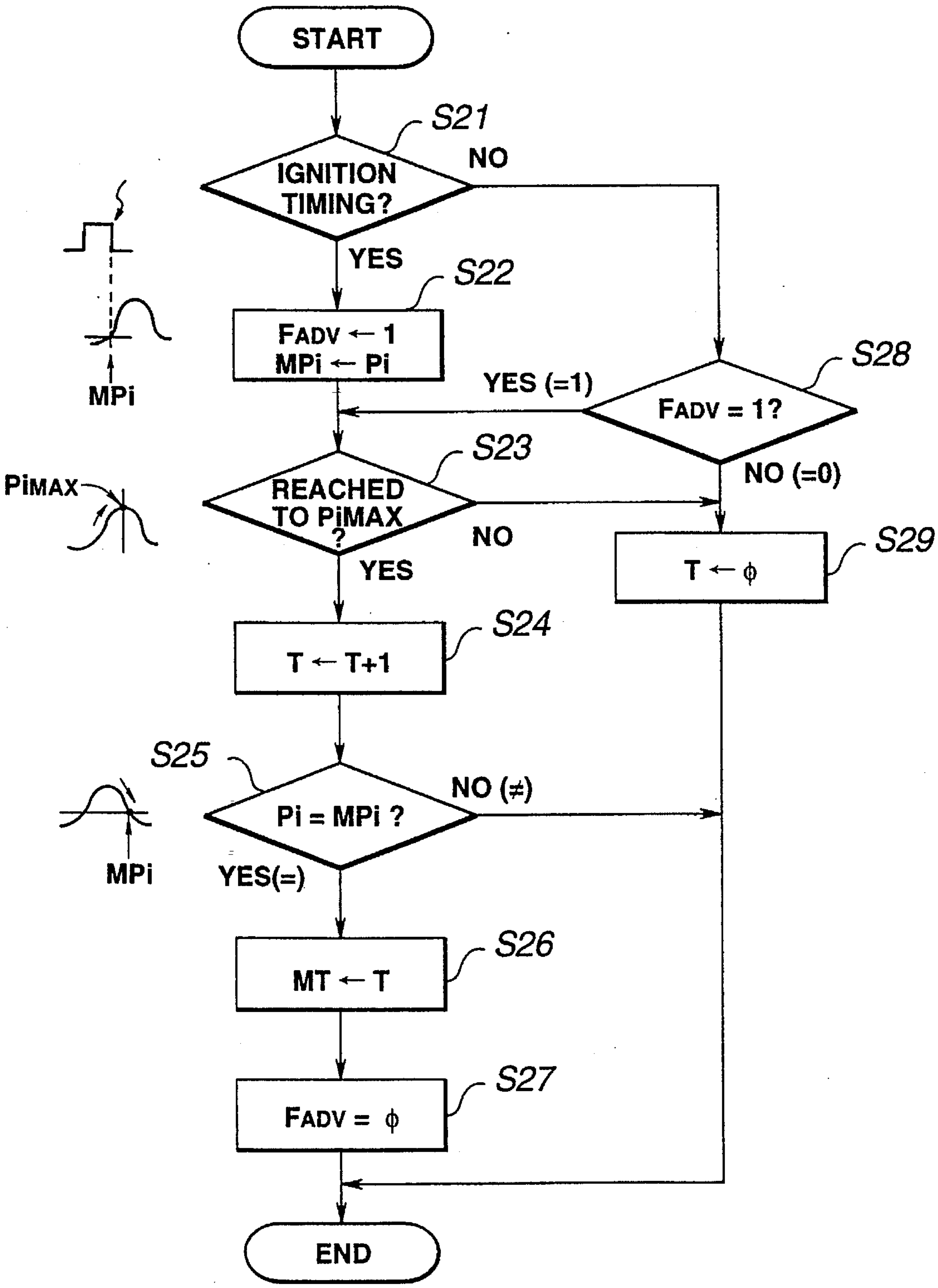
FIG. 5 is art operational flowchart indicating a combustion time duration monitoring routine executed by the control unit in a case of a second preferred embodiment of the diagnosing apparatus according to the present invention.

FIG. 5 shows an operational flowchart executed by the control unit in the case of the second embodiment in place of the flowchart shown in FIG. 3.

The structure of the diagnosis apparatus in the second embodiment is the same as that in the case of the first embodiment shown in FIGS. 1 and 2. The flowchart of FIG. 4 is equally applied to the second embodiment.

Referring to FIG. 5, at a step S21, the CPU determines whether the ignition timing signal is outputted to the ignition circuit (device), the ignition timing signal being output on the basis of a crank signal derived from the crank angle sensor 12 and other engine driving condition parameters.

If the ignition timing signal is output at the step S22 (YES), the routine goes to a step S22 in which the failure diagnosis flag $F_{ADV}$ is set to 1 (under the failure diagnosis). At this time, the combustion chamber inner (cylinder) pressure Pi is detected (monitored) by means of the inner cylinder pressure sensor 14, the detected combustion chamber inner (cylinder) pressure is stored in the RAM as MPi, and the routine goes to a step S23. On the other hand, if the CPU determines that the ignition timing signal is not yet outputted at the step S21 (NO), the routine goes to a step S28 in which the CPU determines whether the failure diagnosis flag ($F_{ADV}$) indicates 1.

If the CPU determines that the failure diagnosis flag $F_{ADV}$ indicates 1 (YES) at the step S28, the routine goes to a step S23 to continue the failure diagnosis operation since it is now under the failure diagnosis. If the CPU determines that the failure diagnosis flag $F_{ADV}$ indicates 0 (NO) at the step S28, the routine goes to a step S29 in which the time count value T is reset to 0 and the present flow (routine) is ended.

At the step S23, the CPU determines whether the combustion chamber inner (cylinder) pressure Pi indicates the maximum Pimax according to the measured Pi.

If the combustion chamber inner (cylinder) pressure Pi indicates the maximum value (Pimax) at the step S23 (YES), the routine goes to a step S24. If (NO) at the step S23, namely, the combustion chamber inner (cylinder) pressure Pi does not yet indicate the maximum value, the above-described flow is repeated via the steps S21 and S28 until at the step S23 the CPU determines that the combustion chamber inner (cylinder) pressure indicates the maximum.

At the step S24, the timer is counted up (incrementally) (T=T+1).

At a step S25, the CPU determines whether the monitored combustion chamber inner (cylinder) pressure Pi gives equal to the stored MPi (stored at the step S22). If (YES) at the step S25 (Pi=MPi), the CPU determines that the present time is the approximately end period and the routine goes to a step S26.

If (NO) at the step S25 (Pi≠MPi), the present routine is ended and the above-described steps of the steps S21, S28, S23, and S24 are repeated until Pi=MPi at the step S25.

At a step S26, the present timer count value T is stored in the RAM as MT.

At the next step S27, the failure diagnosis flag $F_{ADV}$ is set to 0.

In the second embodiment, the flowchart shown in FIG. 4 executed in the first embodiment is executed, thus the failure diagnosis of the EGR system being carried out, on the basis of the required time duration at the combustion late period (from the time at which the chamber inner (cylinder) pressure indicates the maximum Pimax to the time at which the chamber inner (cylinder) pressure indicates the same predetermined value (as that when the ignition timing signal is outputted, namely, when the ignition is started).

In the second embodiment, the predictive (reference) time duration $MT_1$ and $MT_2$ shown in FIG. 4 are previously set as the time durations from the time at which the combustion chamber inner (cylinder) pressure would indicate the maximum value to the time at which the combustion chamber inner (cylinder) pressure would indicate the same predetermined value (as that when the ignition is started)according to the combustion state (determined according to the engine load, engine revolution speed, and EGR rate).

The diagnosis apparatus in the second embodiment can diagnose highly accurately the failure in the EGR system utilizing the results of monitoring the combustion chamber inner (cylinder) pressure at the approximately end period of the combustion stroke (combustion time duration) at which the influence of the compression pressure exerted by the piston of the corresponding cylinder is less and at which the remarkable combustion inner pressure difference due to the execution of the EGR and non-execution of the EGR or the deviation between the target EGR rate and actual EGR rate is sufficiently reflected. Hence, the failure in the EGR system can highly accurately be diagnosed.

Although, in the second embodiment, the time duration from the time at which the combustion chamber inner (cylinder) pressure indicates the maximum value Pimax to the time at which the combustion chamber inner (cylinder) pressure indicates the same predetermined value as that when the ignition via the ignition plug is started is explained as the predetermined combustion time duration MT, the time duration from a time at which the corresponding piston reaches to the Upper Top Dead Center (TDC) to the reduction of the combustion chamber inner (cylinder) pressure to the predetermined combustion chamber inner (cylinder) pressure may alternatively be the combustion time duration MT.

In each embodiment, the exhaust gas recirculation (EGR) passage is opened or closed by means of the diaphragm type valve. Alternatively, the EGR passage may directly be opened or closed by means of an electromagnetic solenoid valve. In addition, a stepping motor type EGR control valve may be installed in place of the EGR solenoid valve 9.

As shown in the step S15 of FIG. 15, since the warning signal is outputted from the control unit 8, a warning lamp (buzzer or so forth) is turned on to indicate the occurrence of failure in the EGR system in response to the warning signal.

Furthermore, the monitoring (detection) of the predetermined combustion time duration is not only based on the ignition timing signal and combustion chamber inner (cylinder) pressure but also may be based on another combustion state related parameter, for example, a combustion temperature, a heat generation quantity, or gas composition variation in a representative cylinder (corresponding one of the engine cylinders).

What is claimed is:

1. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, comprising:

a) detecting means for detecting an engine driving condition;

b) combustion state related parameter measuring means for measuring a combustion state related parameter of at least one combustion chamber of engine cylinders;

c) combustion time duration measuring means for measuring a length of a combustion time duration in one combustion stroke within the combustion chamber including at least an approximately end period of the one combustion stroke on the basis of the measured combustion state related parameter;

d) predictive combustion time duration determining means for determining a target recirculation rate to be normally achieved by controlling an opening angle of the exhaust gas recirculation control valve means via the EGR control signal on the basis of the detected engine driving condition and for determining a length of a predictive combustion time duration on the basis of the determined target exhaust gas recirculation rate; and e) failure diagnosing means for comparing the length of the measured combustion time duration with that of the predictive combustion time duration so as to diagnose whether a failure occurs in the exhaust gas recirculation system according to a result of the comparison.

2. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, as claimed in claim 1, wherein said diagnosing means outputs a warning signal when said failure diagnosing means diagnoses that the failure occurs in the exhaust gas recirculation system.

3. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, as claimed in claim 1, wherein said combustion state related parameter measuring means comprises combustion chamber inner pressure measuring means for monitoring a combustion chamber inner pressure and wherein said combustion time duration measuring means measures a first time at which said combustion chamber inner pressure indicates a predetermined combustion chamber inner pressure, measures a second time duration from a third time at which the monitored chamber inner cylinder pressure indicates a maximum (Pimax) to a second time at which the monitored chamber inner pressure indicates the same predetermined chamber inner pressure as that at the first time, the second time indicating the approximately end time period, as the length of the combustion time duration.

4. An apparatus for diagnosing an exhaust gas recirculation system having an exhaust gas recirculation control valve means interposed in an exhaust gas recirculation passage of an internal combustion engine so as to recirculate part of exhaust gas into a suction system of the engine in response to an EGR control signal, as claimed in claim 1, wherein said combustion state related parameter measuring means comprises combustion chamber inner pressure measuring means for monitoring a combustion chamber inner pressure and wherein said combustion time duration measuring means measures a first time duration from a first time at which the monitored combustion chamber inner pressure indicates a predetermined combustion chamber inner pressure, a magnitude of the combustion chamber inner pressure is varied, and to a second time at which the combustion chamber inner pressure, the second time indicating the approximately combustion end period, as the length of the combustion time duration.

5. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, as claimed in claim 4, wherein said combustion time duration measuring means comprises detecting means for detecting an ignition timing for a corresponding combustion chamber at which an ignition has started as the first time.

6. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, as claimed in claim 5, wherein said failure diagnosing means refers to a map indicating the predictive combustion time duration ($MT_1$) according to the detected engine driving condition when said exhaust gas recirculation control valve means is in an on state in response to the EGR control signal (EGR-ON) which corresponds to the target exhaust gas recirculation rate (target EGR rate) or indicating the predictive combustion time duration ($MT_2$) according to the detected engine driving condition when the exhaust gas recirculation control valve means is in an off state in response to the EGR control signal (EGR-OFF) which corresponds to zeroed exhaust gas recirculation rate, sets the predictive time duration ($MT_1$ or $MT_2$) as the predictive time duration (MTA) depending on whether the exhaust gas recirculation valve means is in the on state or in the off state, derives an absolute difference ($\Delta$MT) between the measured time duration (MT) and the predictive time duration (MTA), and determines whether the absolute difference ($\Delta$MT) is equal to or above a predetermined value (Pre) so as to diagnose whether the failure in the exhaust gas recirculation system occurs.

7. An apparatus for diagnosing an exhaust gas recirculation system having exhaust gas recirculation control valve means interposed in an exhaust gas recirculation passage off an internal combustion engine so as to recirculate part of exhaust gas into a suction system of the engine in response to an EGR control signal, as claimed in claim 6, wherein when said failure diagnosing means determines that the absolute difference ($\Delta$MT) is equal to or above the predetermined value (Pre), said failure diagnosing means outputs a warning signal indicating that the failure in the exhaust gas recirculation system occurs.

8. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, as claimed in claim 7, wherein said predetermined value (Pre) is varied according to the engine driving condition.

9. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, as claimed in claim 7, wherein said predetermined value (Pre) is varied according to whether the content of the EGR control signal is an EGR-ON which corresponds to the target EGR rate or is an EGR-OFF which corresponds to the zeroed EGR rate.

10. An apparatus for diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, said apparatus comprising:

a) first measuring means for measuring an engine driving condition;

b ) first detecting means for detecting an ignition timing of a corresponding one of combustion chambers in engine cylinders;

b) second measuring means for measuring a magnitude of the inner cylinder pressure (Pi) in the corresponding one of the engine combustion chambers from a time when the first detecting means detects the ignition timing;

c) time duration measuring means for measuring a predetermined time duration from a start time at which the inner cylinder pressure indicates a first predetermined value (MPi) when the ignition timing is detected to an end time at which the inner combustion chamber pressure again indicates the first predetermined value (MPi);

d) reference time duration calculating means for driving a targets exhaust gas recirculation rate on the basis of the detected engine driving condition and for calculating a reference time duration ($MT_1$, $MT_2$) on the basis of the calculated target gas recirculation rate;

e) comparing means for comparing the predetermined time duration (MT) and the reference time duration (MTA) and for diagnosing whether a failure occurs in the exhaust gas recirculation system according to a result of the comparison; and f) outputting means for outputting a warning signal when said comparing means diagnoses that the failure occurs in the exhaust gas recirculation system.

11. A method fior diagnosing an exhaust gas recirculation system having exhaust gas recirculation control valve means interposed in an exhaust gas recirculation passage of an internal combustion engine so as to recirculate part of exhaust gas into a suction system of the engine in response to an EGR control signal, comprising the steps of:

a) detecting an engine driving condition;

b) measuring a combustion state related parameter of at least one combustion chamber of engine cylinders;

c) measuring a length of a combustion time duration in one combustion stroke within the combustion chamber including at least an approximately end period of the one combustion stroke on the basis of the measured combustion state related parameter;

d) determining a target recirculation rate to be normally achieved by controlling an opening angle of the exhaust gas recirculation control valve means via the EGR control signal on the basis of the detected engine driving condition and determining a length of a predictive combustion time duration on the basis of the determined target exhaust gas recirculation rate;

e) comparing the length of the measured combustion time duration with that of the predictive combustion time duration so as to diagnose whether a failure occurs in the exhaust gas recirculation system according to a result of the comparison; and f) outputting a warning signal if diagnosing that the failure occurs in the exhaust gas recirculation system at the step e).

* * * * *